United States Patent [19]
Wesolowsky

[11] Patent Number: 5,459,884
[45] Date of Patent: Oct. 24, 1995

[54] SELECTIVE TOILET FLUSH APPARATUS

[76] Inventor: Charles L. Wesolowsky, 8017 13th Ave., St. Petersburg, Fla. 33707

[21] Appl. No.: 363,368

[22] Filed: Dec. 23, 1994

[51] Int. Cl.$^6$ .................................................. E03D 1/14
[52] U.S. Cl. ................................................................ 4/325
[58] Field of Search .............................. 4/324, 325, 395, 4/403, 404

[56] References Cited

U.S. PATENT DOCUMENTS

| | | | |
|---|---|---|---|
| 2,883,675 | 4/1959 | Hartman | 4/324 |
| 3,365,730 | 1/1968 | Chiappetta | 4/325 |
| 3,812,545 | 5/1974 | Lanahan | 4/324 |
| 4,225,987 | 10/1980 | Goldman et al. | 4/325 |
| 4,593,419 | 6/1986 | Derus | 4/324 |
| 4,945,580 | 8/1990 | Schmitt et al. | 4/325 |
| 5,004,462 | 4/1991 | Mahler | 4/325 |
| 5,228,144 | 7/1993 | Kightlinger | 4/324 |
| 5,259,074 | 11/1993 | Battle | 4/325 |

*Primary Examiner*—Robert M. Fetsuga
*Attorney, Agent, or Firm*—James E. Larson; Herbert W. Larson

[57] ABSTRACT

A system for controlling and saving water to be used with a toilet flushing apparatus permitting adjustable partial flush and full flush capabilities. A control housing having a pin inserted therethrough has a pointed tip portion entering an aperture formed in a bottom end of the control housing providing an adjustable needle valve. The effective size of the needle valve determines the rate at which water expels from the housing. A flexible tube attached to the control housing leads to a cavity in a flapper valve. The flapper valve covers a drainage port in a holding tank of a toilet when the toilet is unflushed. When the toilet is flushed, air is drawn from the cavity of the flapper into an inner chamber of the control housing as water leaves the control housing, thereby causing the flapper to change from a positive to a negative buoyancy state. The flapper can therefore be reseated upon the port before all the water has left the holding tank. A clamping mechanism on the lever of the flushing apparatus allows the partial flush mode to be quickly disengaged permitting full flush capabilities.

19 Claims, 3 Drawing Sheets

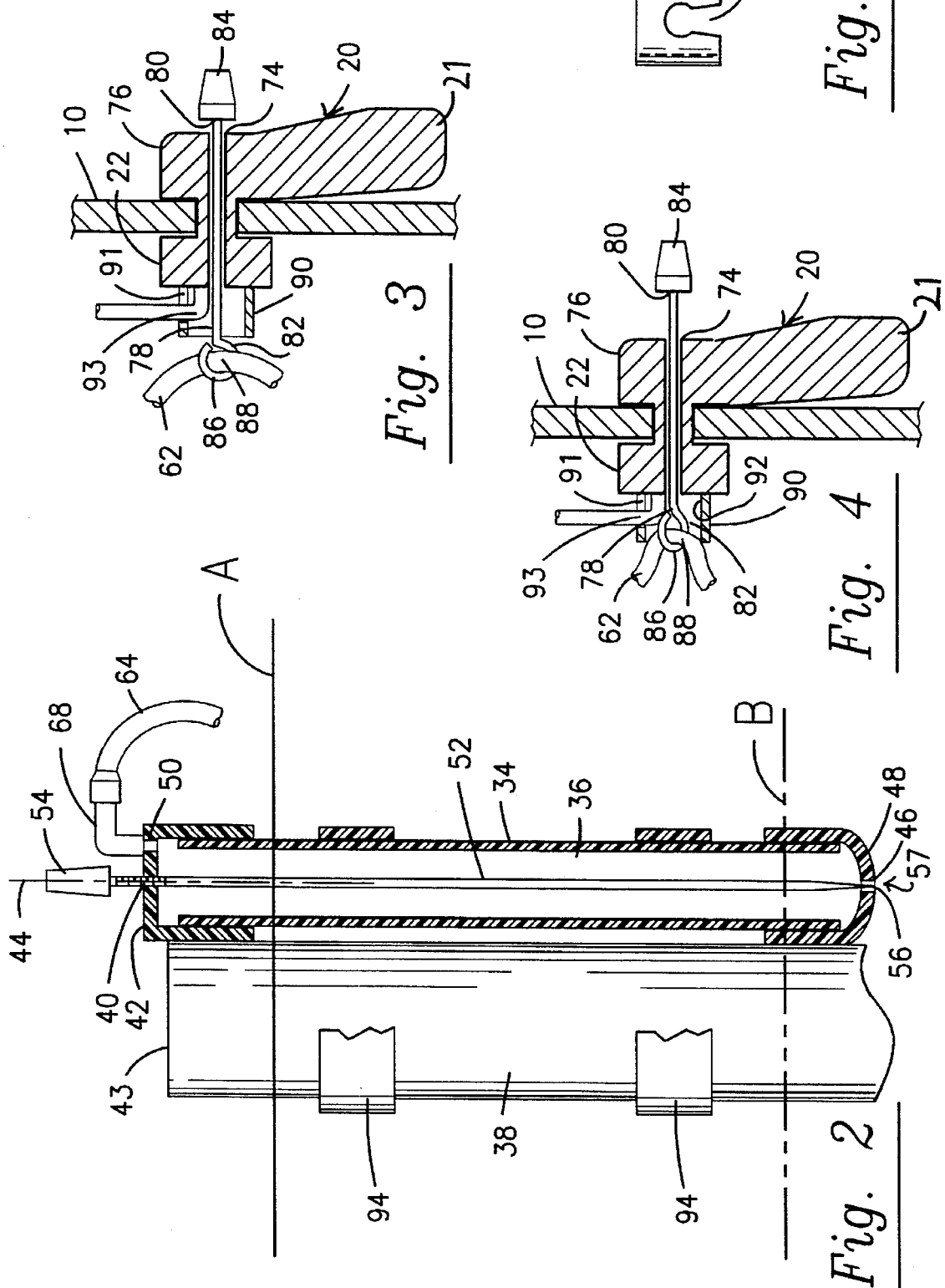

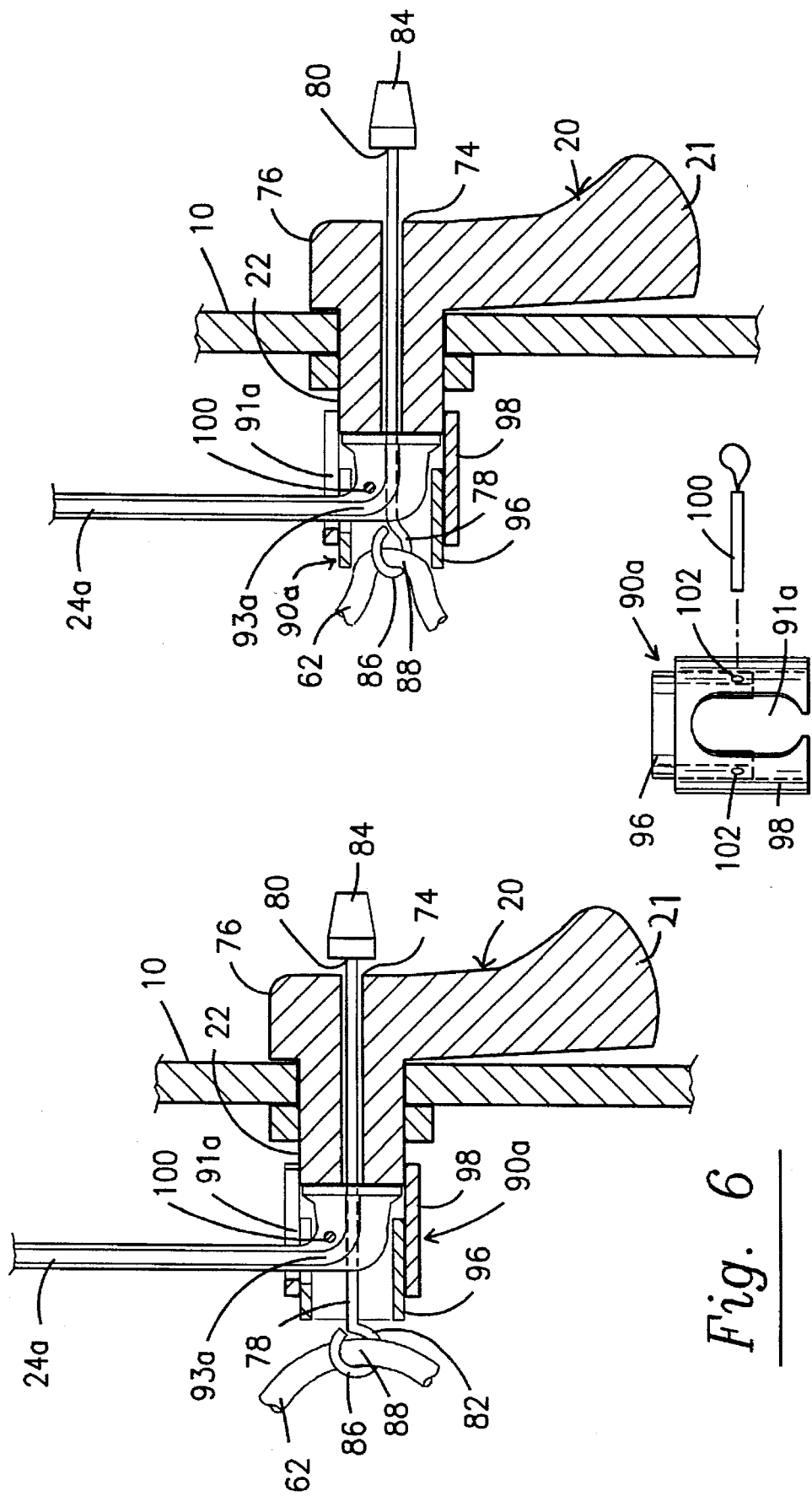

SELECTIVE TOILET FLUSH APPARATUS

BACKGROUND OF THE INVENTION

1. Field of the Invention

This invention relates to a toilet flushing apparatus. More particularly, it relates to a toilet flushing apparatus that allows a selective amount of water to be flushed from a reservoir through the bowl of a toilet to reduce the waste of water.

2. Description of Prior Art

Toilet flushing apparatus and valves are well known in the prior art. Most known flushing apparatus employ a buoyant float which stops the flow of water from entering a holding tank or reservoir from an external water supply when the water level in the tank has reached an upper level. The known flushing apparatus empties most of the water in the reservoir through an opening in the holding tank upon tripping a lever mounted on an outer surface of the toilet. The lever lifts a flapper valve seated upon the opening. The flapper valve is buoyant and reseats upon the opening once the water level has reached a lower limit. The water flushing through the opening in the holding tank washes all the contents of the toilet bowl into the sewer system. Using an apparatus of this type causes excessive water use by not allowing an individual to manipulate the amount of water to be flushed through the bowl.

In an effort to conserve water, attempts have been made in the prior art to allow an individual to perform either a full or partial flush of the water in the reservoir through the bowl. These prior art devices manipulate the buoyancy of the flapper valve by removing air from a cavity in the flapper valve permitting the flapper to reseat upon the opening in the reservoir before the water level has reached the lower limit. Unfortunately, the prior art devices have employed complicated apparatus for achieving the buoyancy manipulation of the flapper valve. The complicated devices are expensive to manufacture and employ too many working parts. This has resulted in low consumer acceptance which has discouraged consumers from installing the devices in their toilets.

The devices that have been simple in design have not permitted a means for adjusting how quickly the buoyancy of the flapper can be eliminated. This has resulted in an apparatus which only allows one set partial flush. Still further, many of the prior art devices have not provided a convenient way in which to bypass the partial flush mode; most require holding down the lever for a full flush. Consumers have not been receptive due to the inconvenience of the requirement to hold down the lever. Many times when a full flush is needed, only a partial flush is performed. Consumers are then forced to reflush the toilet to remove solid wastes from the toilet bowl which were not removed by the inadvertent partial flush. The result is the wasting of water.

There exists a need for a water saving device for toilets which permits full and partial flush. The water saving device should permit individual manipulation of a desired partial flush water amount. The device should also permit simple elimination of the partial flush mode so that a full flush can be easily performed. The device should perform all of the above specified functions utilizing a simple and inexpensive design.

SUMMARY OF THE INVENTION

I have invented an improved toilet flushing apparatus incorporating a water control system. My device permits a partial or full flush. Further, my device permits an individual to choose the amount of water to be expelled through the bowl in the partial flush, since the needs of individuals may be different from toilet to toilet and from household to household. Still further, my invention allows the individual to quickly disengage the partial flush mode thereby permitting a full flush. Yet further, my invention is inexpensive to manufacture and encompasses minimal moving parts. The simple and inexpensive design is alluring to consumers and encourages individuals to install the apparatus which saves water when used properly.

My control system employs a cylindrical water control housing mounted to a toilet flushing apparatus having a needle valve positioned in a bottom end. A threaded opening at a top end receives a threaded pin. A tip portion of the threaded pin inserts into an aperture at the bottom end to form the needle valve. The effective size of the aperture can be varied by a relative position of the tip portion of the threaded pin inserting therethrough.

A flexible tube attaches at a first end to the top end of the control housing and at a second end to an opening in the flapper valve. The tube permits air to be drawn from a cavity in the flapper valve into an inner chamber of the control housing as water leaves the control housing, thereby destroying the buoyancy of the flapper. The negatively buoyant flapper can then reseat upon the opening in the holding tank. The quicker the water leaves the control housing, the quicker the flapper can be reseated, thereby using less water. The rate at which water leaves the control housing is proportional to the size of the aperture controlled by the pin in the control housing. The size of the aperture is determined by the position of the tip portion of the threaded pin.

The partial flush mode can be quickly disengaged to permit a full flush by pulling a button mounted through a handle of the flush lever. The button is attached to a rod having a looped member at a distal end. The flexible tube passes through the looped member. When the button is pulled outwardly from the lever, the flexible tube is drawn into a bushing and clamped thereby preventing any air from passing through the tube. When the flush lever is tripped, all the water in the reservoir will expel out through the opening in the holding tank. The partial flush mode is quickly reengaged by pushing the button back against the handle of the flush lever thereby unclamping the flexible tube.

BRIEF DESCRIPTION OF THE DRAWINGS

The invention may be best understood by those having ordinary skill in the art by reference to the following detailed description when considered in conjunction with the accompanying drawings in which:

FIG. 2 is a side elevation in section of an adjustable water control housing of the present invention attached to an overflow tube of the toilet flushing apparatus;

FIG. 3 is a top plan view in section of a toilet trip lever employed with the toilet flushing apparatus of the present invention illustrating how air is permitted to flow through an unobstructed elastomeric tube; and FIG. 4 is a top plan view in section of the toilet trip lever employed with the toilet flushing apparatus of the present invention illustrating how air is prevented from flowing through a clamped elastomeric tube;

FIG. 5 is a side elevational view of a bushing used in the toilet flushing apparatus of the present invention;

FIG. 6 is a top plan view in section of a toilet trip lever employed with an alternate toilet flushing apparatus of the present invention illustrating how air is permitted to flow through an unobstructed elastomeric tube;

FIG. 7 is a top plan view in section of the toilet trip lever employed with the alternate toilet flushing apparatus of the present invention illustrating how air is prevented from flowing through a clamped elastomeric tube; and FIG. 8 is a side elevational view of a bushing used in the alternate toilet flushing apparatus.

DETAILED DESCRIPTION OF THE INVENTION

Figure 1:
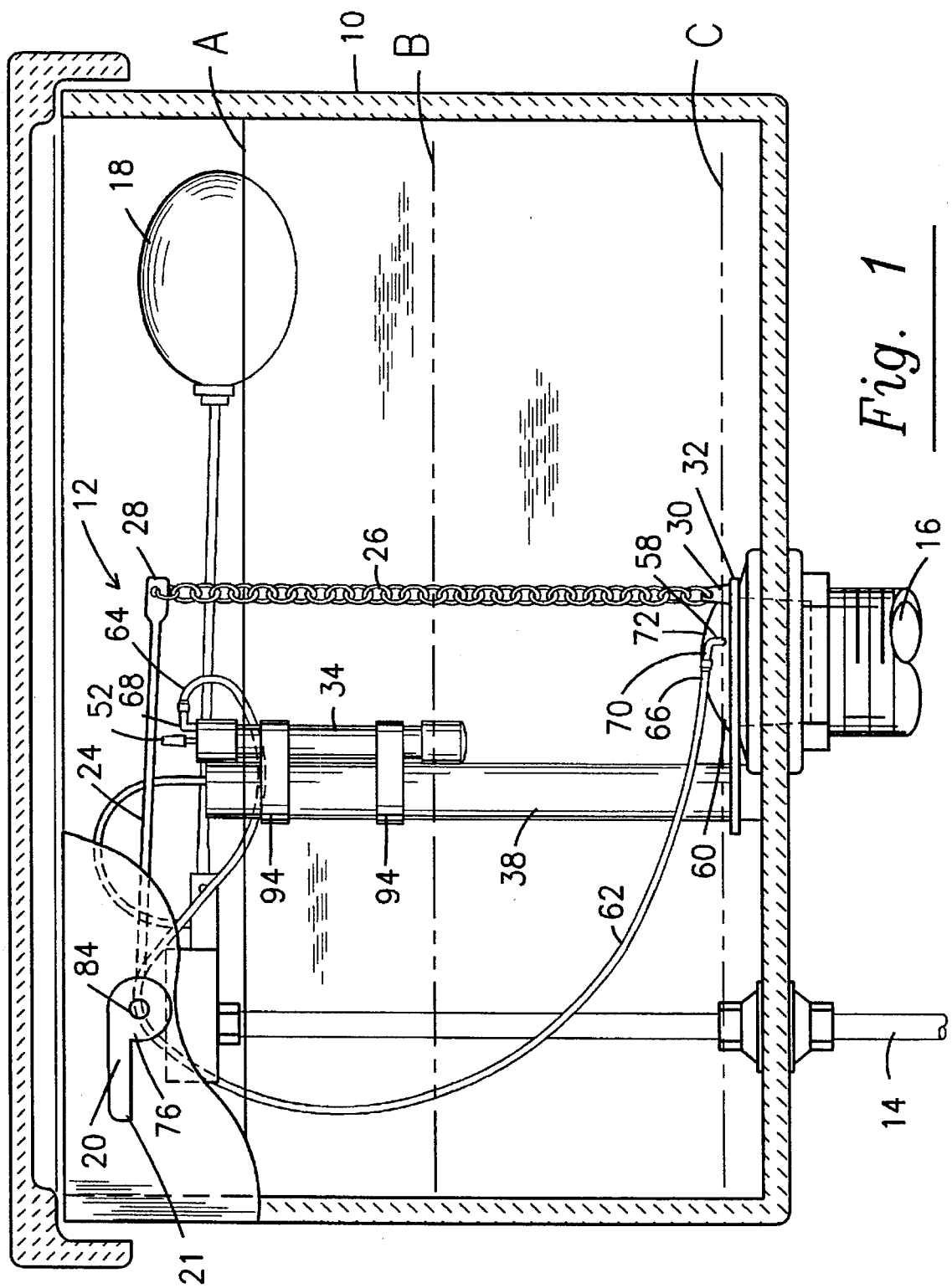
FIG. 1 is a side elevation in section of a toilet water holding tank having a toilet flushing apparatus of the present invention employed with in the water tank.

Throughout the following detailed description, the same reference numerals refer to the same elements in all figures.

Referring to FIG. 1, a holding tank 10 of a toilet is shown. Holding tank 10 encloses a toilet flushing apparatus 12 for regulating an amount of water to enter tank 10 from an external water supply 14 and for releasing the water from tank 10 through a drainage port 16 and through a toilet bowl (not shown) thereafter. The toilet bowl may contain either liquid or solid waste to be disposed of into a sewer system.

Referring to FIG. 1, a buoyant float 18 is used to shut off a valve (not shown) to the external water supply 14 when float 18 has reached an upper limit. Water level "A" represents the maximum amount of water that can be retained in holding tank 10. This type of water shut off system is well known in the prior art. Other shut off systems could be used with the present invention. Further to FIG. 1, flushing apparatus 12 has a flush lever 20 mounted through holding tank 10 secured by a lever mount 22 (shown in FIGS. 3 and 4). Lever 20 is attached to a lifting arm 24 which has a lifting string 26 secured at a distal end 28 from lever 20. String 26 is attached to a flapper valve 30 seated upon drainage port 16. A flange 32 of flapper valve 30 provides a water tight seal for prohibiting any water in tank 10 from washing through port 16 so long as flapper 30 is seated upon port 16. Upon tripping lever 20, flapper valve 30 is unseated from port 16 permitting water to wash into the toilet bowl through port 16. The difference in water level "A" and water level "C" represents the maximum amount of water that can be expelled from holding tank 10 through drainage port 16.

Referring to FIG. 2, a water control housing 34 having an inner chamber 36 is mounted along an overflow tube 38 of flushing apparatus 12 such that a top end 42 is positioned slightly above a top end 43 of overflow tube 38. A threaded first opening 40 is formed at top end 42 along a central axis 44 of control housing 34. An aperture 46 is formed at a bottom end 48 of control housing 34 along central axis 44. A second opening 50 is formed at top end 42 of control housing 34 offset from central axis 44. Threaded first opening 40 receives a threaded pin 52 having a thumb grip 54 and a tip portion 56 oppositely positioned. Tip portion 56 is pointed. Pin 52 may be engaged by turning thumb portion 54 either clockwise or counterclockwise for causing tip portion 56 to enter aperture 46 decreasing the size of aperture 46 or withdraw into inner chamber 36 of control housing 34 thereby increasing the size of aperture 46. The effective size of aperture 46 is therefore dependent on a relative position of tip portion 56 of pin 52. The interaction of tip portion 56 entering and withdrawing in aperture 46 provides a needle valve 57 whose size can be varied and controlled in bottom end 48 of control housing 34. Needle valve 57 permits water to enter through and expel out of inner chamber 36 of control housing 34.

Referring to FIG. 1, a third opening 58 is formed in a top surface 60 of flapper valve 30. A bell shaped cavity (not shown) filled with air and positioned below top surface 60 of flapper 30 provides positive buoyancy to flapper 30. A flexible tube 62 is frictionally attached at a first end 64 to second opening 50 of control housing 34 and at a second end 66 to third opening 58 of flapper 30. Flexible tube 62 permits air to be drawn from the cavity into inner chamber 36 of control housing 34. A first and second coupler 68 and 70 are employed to implement frictional attachment of tube 62 to second and third opening 50 and 58 respectively. In the preferred embodiment, third opening 58 is located along a convex portion 72 of flapper 30 proximal to flange 32.

Referring to FIGS. 3 and 4, lever 20 has a trip handle 21 and a bore 74 formed through a base portion 76 and lever mount 22. A rod 78 having a first and second end 80 and 82 respectively is inserted through bore 74. A knob 84 is frictionally attached over first end 80. Second end 82 has an integral loop portion 86 surrounding a middle portion 88 of tube 62. As shown in FIG. 5, a bushing 90 has a key hole 91. Key hole 91 permits bushing 90 to snap over an angled portion 93 of lifting arm 24 thereby seating bushing against lever mount 22, as shown in FIGS. 3 and 4. In an alternate embodiment, as shown in FIGS. 6, 7, and 8, a bushing 90a has a cylindrical inner member 96 inserted within a cylindrical outer member 98 and an opening 91a to fit around an angled portion 93a of an alternate lifting arm 24a. A pin 100 inserts through opposed pin apertures 102, as shown in FIG. 8, to secure bushing 90a in place. It is understood that bushing 90 can be configured in a multiplicity of configurations such that a key hole 91 may snap around a variety of lifting arms 24 used in toilet flushing apparatus.

The configuration of flushing apparatus 12 of the present invention permits an adjustable partial flush or full flush procedure. A full flush procedure is used to dispose of solid waste present in the toilet bowl. A partial flush procedure is used to dispose of liquid waste present in the bowl, since less water is needed. The unique ability of the present invention allows an individual to adjust the amount of water to be expelled through the toilet bowl when flushing in the partial flush mode. Ideally, the adjustment is set when the apparatus is installed, although adjustments can be made anytime the individual wishes.

To perform a partial flush, knob 84 is positioned juxtaposed to base portion 76 of lever 20 as shown in FIG. 3. This permits an unobstructed passageway in tube 62. Thumb grip 54 of pin 52 is adjusted, thereby varying the effective size of needle valve 57, so that tip portion 56 can be set in a desired position. The desired position of tip portion 56 can be set after testing a partial flush of the toilet. Upon flushing the toilet in the partial mode, water drains out of holding tank 10 through drainage port 16. Immediately after flushing the toilet, flapper 30 has a positive buoyant state. Flapper 30 remains above port 16 allowing water to discharge through port 16. As the water level in tank 10 falls, water present in control housing 34 drains through needle valve 57. As water leaves control housing 34, air is drawn from the cavity in flapper 30 through tube 62 into inner chamber 36 of control housing 34. As air is evacuated from the cavity, flapper 30 changes from a positive to a negative buoyant state. At the moment that flapper 30 achieves negative buoyancy it reseats upon drainage port 16, prohibiting any further water discharge. The more needle valve 57 is open, the faster flapper 30 will reseat, resulting in less water use. Conversely, the more needle valve 57 is closed, the slower flapper 30 will reseat, resulting in more water use. Pin 52 can be adjusted to permit flapper 30 to reseat anytime after the point in which the water level is about two inches below level "A".

To perform a full flush, knob 84 is pulled outwardly from base portion 76 of lever 20, as shown in FIG. 4. This permits loop portion 86 to clamp tube 62 between an inner surface 92 of bushing 90 and angled portion 94 of lifting arm 24. The clamped tube 62 prohibits any air from traveling through tube 62 thereby defeating the partial flush mode and permitting a full flush of the water present in holding tank 10. Flushing apparatus can be quickly reset in the partial flush mode by pushing knob 84 back towards lever 20 so that knob 84 is once again in a position juxtaposed to base portion 76 of lever 20.

In the preferred embodiment, control housing 34 is cylindrical and mounted by elastic bands 94 to overflow tube 38. Further to the preferred embodiment, control housing 34 has caps for top and bottom ends 42 and 48, as shown in FIG. 1, and is made of plastic. Further, bushing 90 is made of plastic. Flexible tube 62 is made of a soft and pliable material which has the ability to return to its original shape after being clamped; an example of such material is latex used in medical applications. Other flexible material could be used in series with middle portion 88 to lower the costs of tube 62 while maintaining durability.

The preferred embodiment of the present invention is provided to consumers as a complete apparatus, although a conversion kit could be provided to modify an existing installed flushing apparatus not already having a water control system as described herein. Equivalent elements can be substituted for the ones set forth above to achieve the same results in the same manner. Further, different materials can be substituted for the ones set forth above to achieve the desired water saving results of flushing apparatus 12.

Having thus described the invention what is claimed and desired to be secured by Letters Patent is:

1. A water control system for use with a toilet flushing apparatus inserted in a holding tank of a toilet, the water control system providing adjustable partial flush and full flush capabilities, the toilet flushing apparatus having a flapper valve seated upon a drainage port in the holding tank, the flapper valve having a cavity located underneath a top surface of the flapper for retaining air thereby providing buoyancy to the flapper valve, an overflow tube open at a bottom end to the drainage port, a lever attached to the holding tank of the toilet communicating with a lifting mechanism to lift the flapper from the drainage port, and a float for shutting off an external water supply through a water control valve when the water level has reached an upper limit, the water control system comprising, a water control housing adapted to be mounted on the toilet flushing apparatus and having a first opening formed at a top end along a central axis of the control housing, an aperture formed at a bottom end along the central axis of the control housing, and a second opening formed at the top end of the control housing offset from the central axis, a pin inserted through the first opening formed in the top end of the control housing such that a pointed tip portion of the pin enters the aperture formed in the bottom end of the control housing providing an adjustable needle valve, the position of the tip portion being adjustable, the pin having a thumb grip distal from the tip portion providing a means to adjust the position of the tip portion, a flexible tube attached at a first end to the second opening of the control housing and at a second end adapted to be attached to a third opening formed in the top surface of the flapper valve, the tube providing a passageway from which air can be drawn from the cavity in the flapper valve into an inner chamber of the control housing, a clamping mechanism for attachment through the lever of the toilet flushing apparatus providing the full flush capability, the clamping mechanism having a grip portion adapted to extend outwardly from the lever, a rod having a first end attached to the grip portion and a second end attached to a loop portion and adapted to extend through a horizontal bore in the lever, and a bushing adapted to be mounted on an inside portion of the lever, a middle portion of the flexible tube surrounded by the loop portion such that when the grip portion is pulled outwardly from the lever the loop portion clamps the flexible inside the bushing prohibiting any air from traveling through the flexible tube thus permitting the flapper to remain positively buoyant for full flush capability, and the pin inserted through the control housing providing the adjustable partial flush capability when the grip portion of the button is juxtaposed to the lever, the pin permitting water to expel from the control housing through the needle valve when the water level in the holding tank has dropped thereby drawing air from the cavity in the flapper through the flexible tube and into the inner chamber of the control housing, the relative position of the tip portion entering the aperture determining the size of the needle valve, the needle valve determining the rate at which water expels from the control housing and the rate at which the buoyancy of the flapper valve changes from a positive to a negative state.

2. The water control system according to claim 1, wherein the water control housing is a cylinder adapted to be mounted parallel to the overflow tube of the toilet flushing apparatus.

3. The water control system according to claim 2, wherein the water control housing mounting includes elastic bands.

4. The water control system according to claim 1, wherein the first opening and pin are threaded.

5. The water control system according to claim 4, wherein the thumb grip of the threaded pin is turned clockwise or counterclockwise to change the relative position of the tip portion entering the aperture.

6. The water control system according to claim 1, wherein the flapper valve reseats itself upon the drainage port at a point ranging from when the water level in the holding tank is about two inches below the upper limit to a point when the water level in the holding tank is about one inch above the drainage port.

7. The water control system according to claim 1, wherein the flexible tube frictionally attaches at the first end to the control housing by a first coupler and at the second end to the flapper valve by a second coupler.

8. The water control system according to claim 1, wherein the flexible tubing is manufactured from a resilient material capable of returning to its original state after being clamped.

9. The water control system according to claim 1, wherein the loop portion of the rod of the clamping mechanism is integrally attached to the rod.

10. A water control system for use with a toilet flushing apparatus inserted in a holding tank of a toilet, the water control system providing adjustable partial flush and full flush capabilities, the toilet flushing apparatus having a flapper valve seated upon a drainage port in the holding tank, the flapper valve having a cavity located underneath a top surface of the flapper for retaining air thereby providing buoyancy to the flapper valve, an overflow tube open at a bottom end to the drainage port, a lever attached to the holding tank of the toilet communicating with a lifting mechanism to lift the flapper from the drainage port, and a float for shutting off an external water supply through a water control valve when the water level has reached an upper limit, the water control system comprising, a water control housing adapted to be mounted on the toilet flushing apparatus and having a threaded first opening formed at a top end along a central axis of the control housing, an aperture formed at a bottom end along the central axis of the control housing, and a second opening formed at the top end of the control housing offset from the central axis, a threaded pin engaging the threaded first opening formed in the top end of the control housing such that a pointed tip portion of the pin enters the aperture formed in the bottom end of the control housing providing an adjustable needle valve, the pin having a thumb grip distal from the tip portion, the thumb grip turned clockwise or counterclockwise to change a relative position of the tip portion entering the aperture, a flexible tube frictionally attached at a first end to the second opening of the control housing by a first coupler and at a second end adapted to be attachment to a third opening formed in the top surface of the flapper valve by a second coupler, the tube providing a passageway from which air can be drawn from the cavity in the flapper valve into an inner chamber of the control housing, a clamping mechanism for attachment through the lever of the toilet flushing apparatus providing the full flush capability, the clamping mechanism having a grip portion adapted to extend outwardly from the lever, a rod having a first end attached to the grip portion and a second end integrally attached to a loop portion and adapted to extend through a horizontal bore in the lever, and a bushing adapted to be mounted on an inside portion of the lever, a middle portion of the flexible tube surrounded by the loop portion such that when the grip portion is pulled outwardly from the lever the loop portion clamps the flexible inside the bushing prohibiting any air from traveling through the flexible tube thus permitting the flapper to remain positively buoyant for full flush capability, and the pin engaging the first opening of the control housing providing the adjustable partial flush capability when the grip portion of the button is juxtaposed to the lever, the pin permitting water to expel from the control housing through the needle valve when the water level has dropped thereby drawing air from the cavity in the flapper through the flexible tube and into the inner chamber of the control housing, the relative position of the tip portion entering the aperture determining the size of the needle valve, the needle valve determining the rate at which water expels from the control housing and the rate at which the buoyancy of the flapper valve changes from a positive to a negative state.

11. The water control system of claim 10, wherein the water control housing is a cylinder adapted to be mounted parallel to the overflow tube of the toilet flushing apparatus.

12. The water control system according to claim 11, wherein the water control housing mounting includes elastic bands.

13. The water control system according to claim 10, wherein the flapper valve reseats itself upon the drainage port at a point ranging from when the water level in the holding tank is about two inches below the upper limit to a point when the water level in the holding tank is about one inch above the drainage port.

14. The water control system according to claim 10, wherein the flexible tubing is manufactured from a resilient material capable of returning to its original state after being clamped.

15. The water control system according to claim 14, wherein the tube is made from surgical latex.

16. A method of modifying an existing installed toilet flushing apparatus in a holding tank of a toilet to include a water flushing control system permitting the flushing apparatus to have adjustable partial flush and full flush capabilities, the toilet flushing apparatus having a flapper valve seated upon a drainage port in the holding tank, the flapper valve having a cavity located underneath a top surface of the flapper for retaining air thereby providing buoyancy to the flapper valve, an overflow tube open at a bottom end to the drainage port, a lever attached to the holding tank of the toilet communicating with a lifting mechanism to lift the flapper from the drainage port, and a float for shutting off an external water supply through a water control valve when the water level has reached an upper limit, the steps comprising, mounting a control housing within the holding tank having a first opening formed at a top end along a central axis of the control housing, an aperture formed at a bottom end along the central axis of the control housing, and a second opening formed at the top end of the control housing offset from the central axis, inserting a pin through the first opening formed in the top end of the control housing such that a pointed tip portion of the pin enters the aperture formed in the bottom end of the control housing providing an adjustable needle valve, the pin having a thumb grip distal from the tip portion, mounting the control housing having the pin inserted therethrough to the toilet flushing apparatus, attaching a flexible tube at a first end to the second opening of the control housing and at a second end to a third opening formed in the top surface of the flapper valve, the tube providing a passageway from which air can be drawn from the cavity in the flapper valve into an inner chamber of the control housing, mounting a modified lever having a trip handle and a horizontal bore formed through a lever mount and a base portion of the modified lever to the holding tank of the toilet and communicating the lever with the lifting mechanism to lift the flapper from the drainage port, attaching a clamping mechanism to the modified lever, the clamping mechanism having a grip portion extending outwardly from the modified lever, a rod extending through the horizontal bore formed in the modified lever having a loop portion attached at a second end, and a bushing seated on an inside portion of the modified lever against the lever mount, surrounding a middle portion of the flexible tube with the loop portion of the rod, providing full flush capability of the flushing apparatus with the control system installed by pulling the grip portion of the clamping mechanism outwardly from the base portion of the modified lever so that the loop portion of the rod clamps the flexible tube within the bushing prohibiting any air from traveling through the flexible tube, and providing adjustable partial flush capability by positioning the grip portion of the clamping mechanism juxtaposed to the base portion of the modified lever, permitting water to expel from the control housing through the needle valve when the water level in the holding tank has dropped, and permitting air to be drawn from the cavity in the flapper through the flexible tube and into the inner chamber of the control housing, a relative position of the tip portion entering the aperture determining the size of the needle valve, the needle valve determining the rate at which water expels from the control housing and the rate at which the buoyancy of the flapper valve changes from a positive to a negative state, the effective size of the needle valve adjusted by turning the knob attached to the pin clockwise or counterclockwise.

17. The method of claim 16, wherein the first opening formed in the control housing is threaded for receiving a threaded pin.

18. The method of claim 16, wherein the control housing is a cylinder mounted parallel to the overflow tube of the toilet flushing apparatus.

19. The method of claim 18, wherein the control housing is mounted to the overflow tube by elastic bands.

* * * * *